United States Patent [19]
Dohrer et al.

[11] Patent Number: 5,147,709
[45] Date of Patent: Sep. 15, 1992

[54] STRETCH FILM WITH REDUCED NOISE AND NECK

[75] Inventors: Gregory L. Dohrer, Broken Arrow; Michael D. Holler, Collinsville; Dwyane B. Nichols, Tulsa, all of Okla.

[73] Assignee: Paragon Films Incorporated, Broken Arrow, Okla.

[21] Appl. No.: 722,839

[22] Filed: Jun. 28, 1991

[51] Int. Cl.$^5$ ............................................. B32B 27/00
[52] U.S. Cl. .................................... 428/213; 428/218; 428/516
[58] Field of Search ................. 428/515, 516, 213, 218

[56] References Cited

U.S. PATENT DOCUMENTS

| | | | |
|---|---|---|---|
| 4,367,256 | 1/1983 | Biel | 428/218 |
| 4,399,180 | 8/1983 | Briggs et al. | 428/212 |
| 4,436,788 | 3/1984 | Cooper | 428/483 |
| 4,923,750 | 5/1990 | Jones | 428/516 |
| 5,004,647 | 4/1991 | Shah | 428/349 |
| 5,019,315 | 5/1991 | Wilson | 264/171 |

FOREIGN PATENT DOCUMENTS 3023934 1/1991 Japan ........................... 428/500

Primary Examiner—Edith L. Buffalow
Attorney, Agent, or Firm—Pravel, Gambrell, Hewitt, Kimball & Krieger

[57] ABSTRACT

A stretch wrap multi-layer film having a sound dampening property wherein the sound dampening property is provided by a layer of ULDPE or LLDPE and high strength and puncture resistance are provided by a second layer containing a LLDPE. The neck in characteristic of linear polymers is overcome by blending into the second layer a minor amount of a non-linear LDPE.

20 Claims, 1 Drawing Sheet

STRETCH FILM WITH REDUCED NOISE AND NECK

FIELD OF THE INVENTION

The invention relates to multi-layer thermoplastic films, and more particularly to a multi-layer film that is useful for wrapping palletized loads. The invention is drawn to a film with improved noise dampening properties. The noise dampening properties of the film reduce the noise associated with wrapping pallets of goods in a warehouse or factory environment. The invention is further drawn to a rolled film which can be elongated during wrapping by a braking force applied to the film roll, without significant film width reduction.

BACKGROUND OF THE INVENTION

The use of thermoplastic films to unitize a pallet of goods is becoming an increasingly more preferred method of bundling goods for shipment. In one method, a pallet of goods is wrapped with film by positioning the pallet load on a rotating platform. A vertical roll of plastic film adjacent the rotating platform supplies the wrapping film. The leading edge of the rolled plastic film is laid along a vertical surface of the load. As the pallet is rotated, plastic film is unrolled and drawn about the load. A braking force applied to the film roll stretches the film during the wrapping process. The tensioned, wrapped film applies a generally inward force that retains the goods in a tight bundle. At the end of the wrapping process, rotation is ceased, the film is cut and the trailing edge is tacked to the film over-wrap by tape, spray adhesive, or by the cling properties of the film itself.

Cling properties may be imparted to a non-clinging polyethylene film by addition of a tackifier such as glycerol mono or di-oleate, polypropylene glycol, sorbitan mono oleate, mono and diglycerides, fatty acid esters, and mineral or vegetable oils. Unblended thermoplastics which have an inherent cling property are also known, such as certain copolymers of polyethylene and 1-octene, 1-butene and 1-hexene. However, few of these blended or unblended films exhibit the toughness and elongation properties desirable for an industrial-use wrapping film.

It is well known in the art to combine the cling properties of the aforementioned compositions with the toughness and elongation properties of other types of polyethylene in multi-layer films. U.S. Pat. No. 4,399,180 discloses such a film having an A/B/A structure. The inner B layer is a linear low density polyethylene copolymer, and the outer A layers are a highly branched low density polyethylene. In addition to the cling property, the skins resist reduction in film width when the film is stretched.

U.S. Pat. No. 4,436,788 discloses a two layer stretch wrap film comprising a layer of ethylene vinyl acetate copolymer with a tackifier and a second layer of a LLDPE. The first layer is characterized by a comonomer incorporation of 25% or more by weight of vinyl acetate, and a melt index of about 0.1 to about 4.0. The second layer is characterized by a specific gravity of between about 0.917 and 0.945.

U.S. Pat. No. 4,367,256 discloses the use of low pressure low density polyethylene (LPLDPE) to reinforce a high pressure low density polyethylene (HPLDPE) film layer in a multi-layer film. When present in from 5-3 wt. percent, LPLDPE was found to increase the strength of a three layer film and improve the cutting characteristics of the film. The HPLDPE and LDPLDPE of that invention are characterized by melt indices of between 0.5 and 7.0 g. 10 min$^{-1}$, and densities less than about 0.932 g. cm$^{-3}$. A tackifier is required to impart cling properties to the film.

U.S. Pat. No. 5,019,315 discloses a three layer stretch resistant film having a good stretched cling. The skin layers of the film are made of a LLDPE copolymer having an inherent cling property. The core layer is made from a high pressure low density polyethylene and is between 15 and 35% of the overall thickness of the film. By adjusting the thickness of the core layer it is possible to make films of varying resistance to elongation.

When using these currently available three-layer films to wrap pallets, the noise associated with the wrapping process may exceed 100 Db. The noise is generated by a segment of unwrapped film extending from the pallet to the film roll. This segment of film is tensioned by the combined action of the rotating pallet and braking force applied to the film. Vibrations generated by peeling the film from the roll are transmitted to the tensioned segment and are amplified into a loud drumming sound by the vibrating film.

It is thus an object of the present invention to provide a three layer film useful for wrapping large pallets of goods and having a sound dampening property capable of reducing noise associated with the wrapping process. It is a further object of the invention to make such a film having the desirable elongation and toughness properties of a linear film.

Linear films, however, are known to undergo film width reduction, or "necking in" when stretched. Multi-layer films known to the art avoid the necking in phenomenon by including in the structure at least one layer of neck in resistant material. For instance, in U.S. Pat. No. 5,019,315, linear low density skin layers are coextruded with a neck in resistant, non-linear low density polymer which comprises the core layer. On the other hand, U.S. Pat. No. 4,399,180 discloses a film having a layer of pure LLDPE with at least one additional layer of a neck in resistant highly branched low density polyethylene.

It is a further object of the invention to counteract film width reduction without additional layers of neck in resistant material.

SUMMARY OF THE INVENTION

The invention provides a multi-layer stretch wrap film having a sound dampening property which reduces noise generated by vibrations transmitted to the film during the wrapping process by 12 Db or more. The multi-layer film may be comprised of two or three or more layers. Most preferably the film comprises at least three layers such as that of an A/B/A type structure wherein both A (or "skin") layers are made of the sound dampening composition of this invention. The sound dampening composition is made from an ultra low density polyethylene, a linear low density polyethylene or blend thereof. The benefits of sound dampening, as well as the cling properties of the skin layers can be realized when the thickness of the individual skin layers is 4% or more of the overall thickness of the multi-layer film. A skin layer comprising a major amount of ULDPE exhibits sufficient cling to obviate the need for a tackifier. The B (or "core") layer of the invention imparts the properties of toughness and elongation to the film. The core layer of the invention is a blend containing a linear low density polyethylene. It is known in the art that unblended linear films have a tendency to neck in, or decrease in width when they are stretched. In known multi-layer films, the presence of neck in resistant polymers in the skin layers counteracts the neck in tendency of the linear core. In the present invention, it has been found that the neck in problem can be reduced by the addition of a minor amount of highly branched low density polyethylene to the core layer. Generally, a film having a maximum elongation of 335% or more can be obtained using a blend of between 5 and 20% non-linear LDPE with LLDPE.

DETAILED DESCRIPTION OF THE PREFERRED EMBODIMENT

Figure 1:
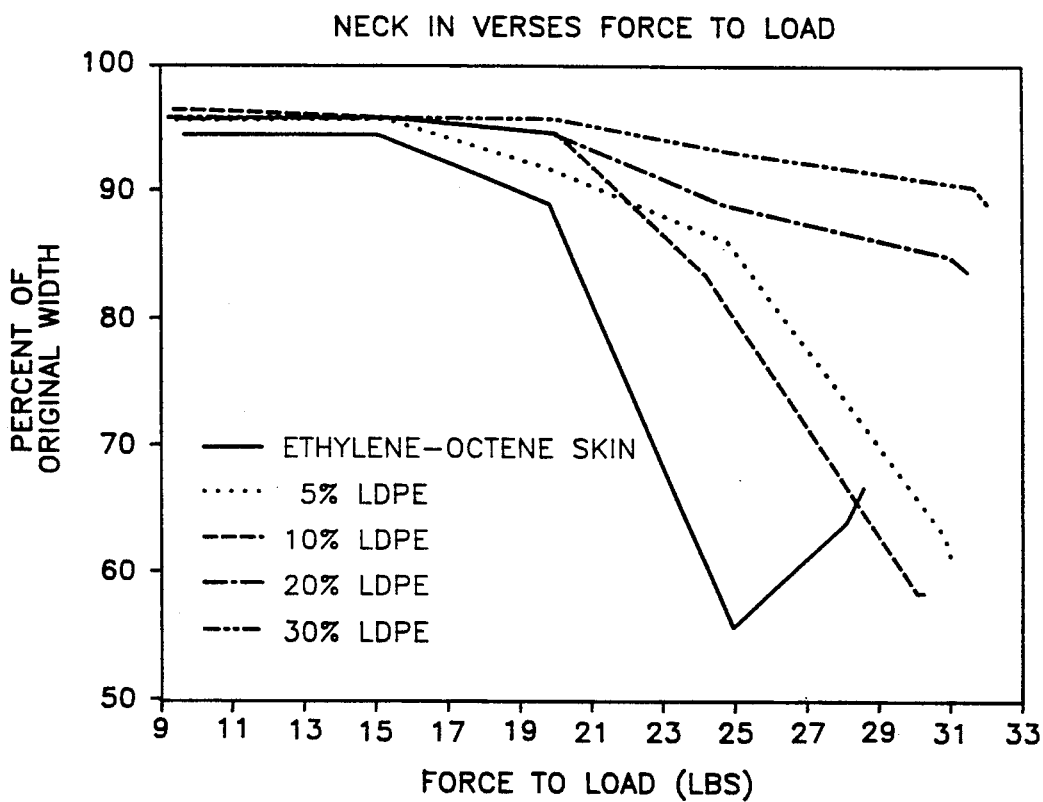
FIG. 1 depicts the elongated film width of various embodiments of the present invention as a function of tension force applied to the film. A plot showing the film width reduction of a film having a pure linear low density polyethylene core layer is provided for comparison.

The invention comprises a low noise, multi-layer film having a first layer which imparts a sound dampening property to the film and a second layer comprising a major amount of linear low density polyethylene and a minor amount of non-linear low density polyethylene, which layer imparts the properties of tensile strength, maximum elongation and puncture resistance to the film.

The preferred embodiment of the multi-layer film of the present invention comprises at least three layers, most preferably that of an A/B/A structure, wherein the A layers are skin layers comprising a sound dampening composition and the B layer is a core layer, predominantly determinative of the puncture resistance, tear resistance, weight, toughness, elongation and relaxation properties of the film.

The major film forming component of the skin layer comprises an ultra low density polyethylene (ULDPE) or linear low density polyethylene (LLDPE), or mixtures thereof. Suitable ULDPE polymers include co-polymers of ethylene and an α-olefin monomer having between 4 and 10 carbon atoms. Suitable ULDPE co-polymers are those having between about 0.1 and 30 MFR (melt flow ratios, MFR, referred to herein are in accordance with ASTM D-1238) and densities of from about 0.900 to about 0.912 g cm$^{-3}$. Preferably, polyethylene copolymers of the skin layer are those having an MFR between about 1 and 4, and densities of between about 0.909 and 0.912 g cm$^{-3}$. Preferred co-monomers of the polyethylene co-polymers suitable for skin forming are such α-olefin isomers as butene, hexene, 4-methyl pentene, and octene. More preferable are the co-polymers of ethylene and butene, hexene or octene. The most preferable, ethylene-octene copolymers generally have an inherent cling property and are approved for food contact by FDA regulations. The amount of α-olefin in the copolymer is generally between about 2 to 15, most preferably, less than 10, weight percent.

Alternatively, the major film forming component of the skin layer may comprise a LLDPE. Suitable LLDPE polymers include co-polymers of ethylene and an α-olefin monomer having between 4 and 10 carbon atoms. Suitable LLDPE co-polymers are those having between about 0.1 and 30 MFR and densities of from about 0.912 to about 0.935 g cm$^{-3}$. Preferably, LLDPE co-polymers of the skin layer are those having an MFR between about 1 and 4, and densities of between about 0.912 and 0.920 g cm$^{-3}$. Preferred co-monomers of the polyethylene co-polymers suitable for skin forming are such α-olefin isomers as butene, hexene, 4-methyl pentene, and octene, most preferable are the co-polymers of ethylene and butene or hexene. The amount of α-olefin in the copolymer is generally between about 2 to 15, most preferably, less than 10, weight percent.

In addition to a major film forming component made from unblended ULDPE or LLDPE, the skin layers of the present invention may contain a blend of the ULDPEs and LLDPEs already described as being suitable for forming of the skin layer. A suitable blend may vary over a wide range of ULDPE and LLDPE proportions.

In a skin layer made from unblended LLDPE or a blend of 50% LLDPE or more, it may be desirable to add a minor amount of tackifier. Tackifiers which can be used to impart a cling property to a polyethylene film are well known in the art and include, for instance, polybutene, glycerol mono or di-oleate, polypropylene glycol, sorbitan mono oleate, mono and diglycerides, fatty acid esters, and mineral and vegetable oils. The cling additive can be present in the skin layers in any concentration which will permit the skin surface to cling to the skin surface of a second like film of like composition and structure. A preferred concentration can range from about 0.1 to 20% by weight of the skin layer, most preferably between 0.25 to 6.0 weight percent. Polybutene is the most preferred tackifier.

The various embodiments of the skin layer of the inventive film exhibit a sound dampening property which reduces the amplification of audible vibrations that are transmitted to a tensioned segment of film as the film is peeled from the roll. This property greatly reduces the noise level of a warehouse or factory wherein one or more wrapping apparatus are operating within an enclosed area. The skin layers of the present invention result in a noise reduction of approximately 12 Db, under realistic operating conditions. It is thus possible in the practice of the invention to produce a film whose peel off noise level does not exceed 90 Db.

Peel off noise level is measured by suspending a roll of film vertically on spindles to permit rotation of the roll. A predetermined rotational resistance is applied to the roll. Peel off noise is measured as the film is withdrawn from the roll at a constant velocity. A decibel meter to detect noise is positioned two to three inches from the surface of the roll adjacent to the point on the circumference of the roll where the drawn film peels off.

Significant noise reduction can be obtained with an individual skin thickness of as low as 4% of the overall thickness of an A/B/A film.

In the preferred three plus layered structure of the multi-layer film, the core layer, such as B in an A/B/A structure, is chiefly responsible for tensile strength, toughness, and elongation properties. The core layer is made from a polyethylene blend having a major component of LLDPE.

Suitable LLDPE polymers include co-polymers of ethylene and an α-olefin monomer having between 4 and 10 carbon atoms. Suitable LLDPE co-polymers are those having between about 0.5 and 10 MFR and densities of from about 0.912 to about 0.935 g. cm$^{-3}$. Preferably, LLDPE co-polymers of the core layer are those having an MFR between about 1 and 4, and densities of between about 0.915 and 0.928 g. cm$^{-3}$, especially preferred are those having densities of between about 0.920 and 0.928 g. cm$^{-3}$. Preferred co-monomers of the polyethylene co-polymers are the α-olefin isomers of butene, hexene, 4-methyl pentene, and octene, most preferable are the co-polymers of ethylene and butene, hexene or octene. The amount of α-olefin in the copolymer is generally between about 2 to 15, most preferably less than 10 weight percent.

Such linear polymers are typically capable of elongating 300% or more without tearing. They are also highly puncture resistant, exhibiting a puncture strength of about 6 to 10 lbs. of force in.$^{-1}$ when tested in accordance with ASTM D 4649. These properties of high elongation and puncture resistance are imparted to the multi-layer film of the invention by forming the major part of the core layer of LLDPE.

Despite the aforementioned advantages of linear polymers, linear polyethylene films are prone to undergo a reduction in width as they are stretched. Narrowing of the stretched film is undesirable because it reduces the amount of coverage provided by the film. Moreover, the reduction in coverage may vary greatly with the amount of tension applied to the film (See FIG. 2) such that the film wrap produced by a single wrapping machine may vary greatly and unpredictably.

The skin layers of the invention are not sufficiently resistant to width reduction when applied in the range of thicknesses of the preferred embodiment. Accordingly the invention employs a blended core layer having in addition to a major amount of LLDPE, a minor amount of non-linear low density polyethylene (LDPE) to counteract neck in.

Suitable non-linear LDPE polymers for blending include ethylene homopolymers and copolymers of ethylene and vinyl acetate, acrylic acid, methacrylic acid, ethacrylic acid, methyl acrylate, ethyl acrylate and the like. Further, suitable LDPE homo- and co-polymers are those having an MFR of from about 0.2 to about 50 and a density of from about 0.910 to about 0.960 g cm$^{-3}$. The preferred LDPE homo and co-polymers for blending into the core layer are those having an MFR of from about 0.5 to about 20 and a density of from about 0.917 to about 0.945 g cm$^{-3}$.

Blending the LLDPE polymer with a branched LDPE in the core layer enables the making of a film having essentially the properties of the LLDPE comprising the major component of the core layer. To prevent significant alteration of the elongation, puncture resistance and tensile strength of the multi-layer film, non-linear LDPE is added to the core layer in a minor amount, and preferably less than 30 weight percent of the combined weight of LLDPE and non-linear LDPE of the core layer. Blends containing non-linear LDPE in excess of 30 wt. percent generally have a lower maximum elongation before tearing (As use herein, maximum elongation refers to the maximum elongation before tearing expressed as a percent of the length of the unstretched film). The preferred blend of the core layer has between 5 and 20 wt. percent non-linear LDPE over the combined weight of LLDPE and non-linear LDPE in the core layer.

The skin layers and core layer of the invention, which have each been described individually, can be combined into an A/B/A structure which has essentially the strength, puncture resistance and maximum elongation of the linear polyethylene component of the core layer, which does not exhibit neck-in, and which in addition has a sound dampening characteristic. The sound dampening characteristic can be imparted to the film by a skin layer that is relatively thin in comparison to the overall thickness of the multi-layer structure. A film which is well adapted to wrapping palletized loads is obtained when three layers are combined within the preferred A/B/A thickness range of from about 4/92/4 to about 30/40/30. The advantageous properties of tensile strength and high maximum elongation can be obtained in a film of minimal thickness when the relative thickness of the A and B layers are between 4/92/4, and 10/80/10.

The following A/B/A structure is illustrative of the types of films that can be produced according to the teachings of this invention. The illustrative structure has skin layers made from an ultra low density ethylene-octene copolymer which has an MFR of 3.0 and a density of 0.912 g. cm$^{-3}$. This ULDPE exhibits an inherent cling property which is generally adequate for wrapping palletized loads without the need for a spray adhesive or tape. The core layer of the illustrative structure is a blend containing a LLDPE having an MFR of approximately 2 and a density of approximately 0.926 g cm$^{-3}$. The blend also contains a non-linear LDPE having an MFR of approximately 2.3 and a density of approximately 0.921 g cm$^{-3}$. The core layer blend contains 80% LLDPE and 20% non-linear LDPE. The A and B layers are coextruded into an A/B/A structure having a relative thickness of 7/86/7 and an overall thickness of 0.8 mils (1 mil=1/1000ths in.). This illustrative film possesses a maximum elongation of approximately 335% before tearing. At 200% elongation, the film undergoes a width reduction of approximately 12% of the film's original width. The puncture resistance of the unstretched film is approximately 7.4 lbs in.$^{-1}$ (puncture resistance measured in accordance with ASTM D 4649). The peel off noise level of the film, measured in accordance with the procedure of Example 3 is 87 Db.

The preferred A/B/A film can be made using conventional techniques of coextrusion to assemble the multi-layer structure. Beginning with the component polymers in pellet form, the LDPE and LLDPE of the core layer are premixed to produce a uniform particulate blend, which is then fed into the hopper of a conventional rotating screw extruder. A dry premix is also performed on the skin components if a LLDPE-ULDPE blend is used. The skin component(s) are fed into the hopper of two satellite extruders adjacent to the central extruder containing the core layer resin. Since the skin layers of the multi-layer film may be much thinner than the core layer, it is possible in these instances to use satellite extruders of lower output capacity than the core layer extruder.

The melt viscosity of the skin and core layer resins must be approximately the same. Generally, the viscosity of the resin forming systems of the skin layers are matched to the viscosity of the resin film-forming system of the core layer. Thus, if the viscosity of the resin in the satellite extruders is lower than that of the core layer at any given temperature, then its melt temperature must be reduced to increase its viscosity. If the viscosity of the resin in the satellite extruders is higher than that of the resin film-forming system of the core layer, then its melt temperature must be increased to decrease its viscosity. Since each extruder of the film-forming system operates at a separate melt temperature, the temperature profile of the zones in each extruder will likewise differ. In the making of the illustrative multi-layer film previously described, the core layer extruder can operate at a melt temperature of 520° F. and the satellite extruders can operate at a melt temperature of 470° F. to obtain resins of matched viscosity.

In the coextrusion process, the resins are passed through concentric dies or through a combining adapter which forms concentric flow patterns immediately upstream of a singular die. Thus, the separately formed films are brought together and adhered into a multi-layer composite. In the co-extrusion processes, the extruders should be operating simultaneously to produce the coextruded film. The resulting composite film may then be drawn to its final thickness before quenching.

Various changes in the description above will become apparent to one skilled in the art, which changes do not depart from the spirit of the invention. For instance, one of ordinary skill may appreciate that instead of co-polymers formed of monomers disclosed herein, terpolymers having similar MFR and densities could be used. It should therefore be understood that the description presented and the examples which follow are for illustrative purposes and should not be read as limiting the scope of the invention set forth in the claims.

EXAMPLES

EXAMPLE 1

A comparison example was performed to demonstrate the effect of an ethyl vinyl acetate (EVA) skin in reducing the width reduction of a LLDPE film verses the width reduction of an LLDPE film having ULDPE skins made in accordance with the present invention. The comparison film was an A/B/A film having A layers of EVA of 6.5% thickness relative the overall thickness of the film. The EVA polymer of the skin layers has 5.8% vinyl acetate monomer incorporation and an MFR of 2, and is available from Exxon Chemical Co. under the trade designation CR 5810. The EVA polymer was pre-tackified with 3% polybutene. The core was an unblended LLDPE having an MFR of 2.0 and a density of 0.926 g. cm$^{-3}$, which is available from Dow Chemical Co. under the trade designation 61509.49. The A/B/A film formed thereby had an overall thickness of 0.8 mils and a skin thickness of 7% (the overall thickness of the skin forming component being 14% of the overall thickness).

The same LLDPE core layer was coextruded with an ethylene-octene ultra low density copolymer in accordance with the skin forming aspect of the present invention. The ethylene-octene copolymer had an MFR of 3.0 and a density of 0.912 g. cm$^{-3}$, and is available from Dow Chemical Co. under the trade designation 61509.29. The A/B/A composite film formed thereby had an overall thickness of 0.8 mils. and a skin thickness of 7%.

A neck in test was performed using a Lanteck pallet wrapper. Prior to the test, the roll was threaded through a prestretch mechanism and the leading edge of the film was tied to the pallet. The prestretch was set to 0.0% and was unchanged throughout the test.

Film force-to-load was initially set at 9.5 lbs of tension. The pallet wrapper was then set in motion at 9 rpm. After several revolutions, the pallet wrapper was stopped and the width of the peeled, but unwrapped segment of film, was measured. The force-to-load was then increased to 15 lbs, the pallet wrapper was again set in motion at 9 rpm and, after several revolutions, the pallet wrapper was stopped and the width reduction was measured. These steps were repeated at tension increments of approximately 20, 25, 28 and 30 lbs.

Figure 2:
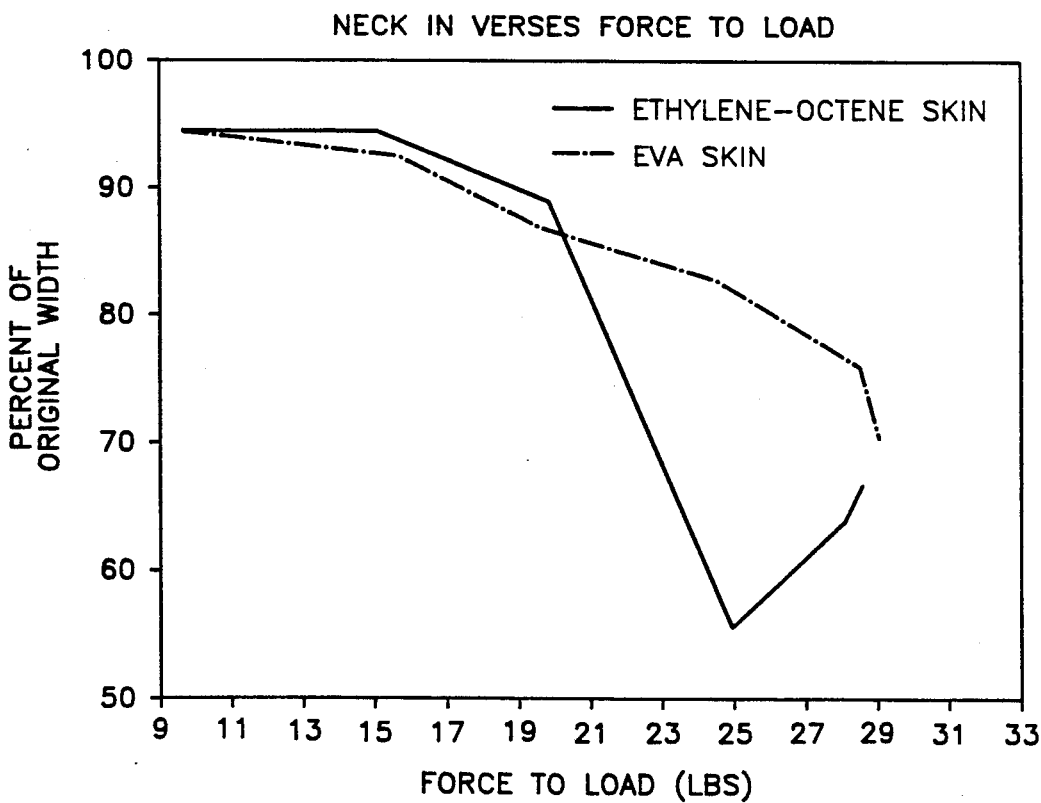
FIG. 2 depicts the elongated film width as a function of tension force of a film having skin layers of ethylene-octene copolymer in accordance with the present invention over an unblended LLDPE core layer. Also depicted for comparison is a corresponding plot for an EVA/LLDPE/EVA film.

The results of the neck in test for each roll are reported in FIG. 2. As demonstrated in the FIGURE, the unblended LLDPE film having an ULDPE skin made in accordance with the invention showed a steep increase in neck in between about 20 and 25 lbs force-to-load. However, the LLDPE film having an EVA skin showed a gradual increase in neck in as the force-to-load was increased.

EXAMPLE 2

As discussed more thoroughly in the description above, the present invention reduces neck in by blending a non-linear LDPE with a LLDPE in the core layer. Example 2 illustrates the effectiveness of various blends at counteracting the necking in tendency of LLDPE films. In this example, A/B/A multi-layer films having ethylene-octene copolymer skins and varying blends of LLDPE and non-linear LDPE in the core were tested for neck in. The skins were made from Dowlex ® 61509.29 as in Example 1 and each skin layer had a relative thickness of 7% of the overall thickness of the film. The LLDPE of the core was an ethylene-octene linear copolymer having an MFR of 2 and a density of 0.926 g. cm$^{-3}$, which is available from Dow Chemical Co. under the trade designation 91509.49. The non-linear LDPE used in the core blends was an ethylene homopolymer having an MFR of 2.3 and a density of 0.921 g. cm$^{-3}$, which is available from Exxon Chemical Co. under the trade designation 113.09. The overall thickness of each of the test films was 0.8 mils.

Five, 10, 20 and 30 percent blends of non-linear LDPE in LLDPE were use in preparation of the various multi-layer films tested. Employing the test procedure of Example 1, the various films were tested for neck in, and the results of these tests are reported in FIG. 1. In addition, the results for the ULDPE/LLDPE/ULDPE film prepared in Example 1 are provided for comparison. As can be seen in FIG. 1, the addition of 5% or more LDPE to the core layer results in a film which undergoes much less neck in than a similar film having an unblended LLDPE core layer when wrapped under a force-to-load of 25 lbs or less. When LDPE is added to the core layer in an amount of 20% or more, the film can be wrapped under a force-to-load of 30 lbs with an approximately 11% reduction in film width.

EXAMPLE 3

A noise test was conducted to demonstrate the noise reduction achieved by using the skin layers of the present invention. In addition, the maximum elongation of various compositions encompassed by the invention was tested. A comparison film EVA/LLDPE/EVA structure, whose characteristics are more fully described in Example 1, was also tested and is indicated as Sample 1 in the table below. The films described more fully in Example 2, having 5, 10, 20 and 30 percent blends of LLDPE and LDPE in the core layer were tested against the comparison. These films are indicated as Sample 2, 3, 4, and 5, respectively.

In addition, three films were prepared having an unblended LLDPE core layer and skin layers of (a) an ultra low density ethylene-octene copolymer, (b) a linear low density ethylene-butene copolymer, and (c) a linear low density ethylene-hexene copolymer. The LLDPE of the core layer of each film had an MFR of 2.0 and a density of 0.926 g. $cm^{-3}$, and is available from Dow Chemical Co. under the trade designation 61509.49. To facilitate comparison with Samples 1 through 5, the films were made with the same relative and overall thickness, ie. a relative thickness of 7/86/7 and an overall thickness of 0.8 mils.

In Sample 6, the skin layer was made from an ultra low density, ethylene-octene copolymer having an MFR of 3.0 and a density of 0.912 g. $cm^{-3}$, which is available from Dow Chemical Co. under the trade designation 61509.29.

In Sample 7, the skin layer was made from an linear low density, ethylene-butene copolymer having an MFR of 2.0 and a density of 0.918 g. $cm^{-3}$, which is available from Exxon Chemical Co. under the trade designation 1002.37.

In Sample 8, the skin layer was made from an linear low density, ethylene-hexene copolymer having an MFR of 3.2 and a density of 0.9175 g. $cm^{-3}$, which is available from Exxon Chemical Co. under the trade designation 3003.37.

The noise test was conducted in accordance with the peel off noise test described above. A roll of the test film was suspended vertically on spindles to permit free rotation of the roll. A rotational resistance of 6 lbs. was applied to the roll. Film was withdrawn at a constant velocity of 138 ft. $min.^{-1}$ for a period of 30 sec. Peel off noise was measured as the film was withdrawn from the roll by a decible meter positioned two to three inches from the surface of the roll adjacent to the point on the circumference of the roll where the drawn film peels off. The table below reports the average noise level detected over the 30 second period is reported for each roll of sample film.

The maximum elongation test was performed using a Lanteck pallet wrapper and conventional prestretch mechanism. A roll of the test sample film is mounted vertically on spindles to permit free rotation. The leading edge of the film is passed through the prestretch mechanism and tied to the pallet. The prestretch mechanism was set to prestretch the sample to 225% of its unstretched length. The pallet wrapper was then set in motion at 18 rpm, and the force-to-load was set at 10 lbs. As the film was unrolled and wrapped around the pallet, the prestretch level was increased until the film failed. After failure, the level of prestretch was recorded, and is reproduced in the Table below as the maximum elongation of each sample.

TABLE

| Sample | Description | Noise (Db) | Maximum Elongation (%) |
|---|---|---|---|
| 1 | EVA/LLDPE/EVA | 102 | 320 |
| 2 | 5% LDPE | 87 | 345 |
| 3 | 10% LDPE | 87 | 340 |
| 4 | 20% LDPE | 87 | 335 |
| 5 | 30% LDPE | 86 | 220 |
| 6 | octene skin | 84½ | 325 |
| 7 | butene skin | 85 | 320 |
| 8 | hexene skin | 84 | 315 |

As can be seen from a comparison of Sample 1 with Samples 2–8, the ULDPE skins of the present invention significantly reduce the noise level associated with peeling film from a roll during wrapping. It can further be seen from a comparison of Samples 6, 7, and 8, that a skin made from an ethylene-octene copolymer achieves comparable sound reduction to butene and hexene copolymer skins but results in a film having a higher maximum elongation. The maximum elongation of the film slowly decreases as the presence of non-linear LDPE in the core blend is increased, until an LDPE content of 20% is reached. Between 20% and 30% LDPE concentration, the maximum elongation drops considerably.

We claim:

1. A stretch wrap thermoplastic multi-layer film comprising:
   as a first layer linear low density polyethylene and a minor amount of non-linear low density polyethylene, and;
   as a second layer an ethylene polymer selected from the group comprising ultra low density polyethylenes having a melt flow ratio of between about 0.1 and about 30 and a density of between about 0.900 and about 0.912 g. $cm^{-3}$ and linear low density polyethylenes having a melt flow ratio of between about 0.1 and about 30 and a density of between about 0.912 and about 0.935 g. $cm^{-3}$, and blends thereof.

2. The stretch wrap thermoplastic multi-layer film of claim 1, wherein the ethylene polymer of the second layer is selected from the group consisting of linear low density copolymers of ethylene and 1-butene, 1-hexene, and 1-octene, and ultra low density copolymers of ethylene and 1-butene, 1-hexene and 1-octene.

3. The stretch wrap thermoplastic multi-layer film of claim 1, wherein the relative thickness of the second layer is between 4 and 30 percent of the overall thickness of the multi-layer film.

4. The stretch wrap thermoplastic multi-layer film of claim 1, wherein the blend of the first layer contains less than 30 percent non-linear low density polyethylene.

5. The stretch wrap thermoplastic multi-layer film of claim 4 wherein the blend of the first layer contains between 5 and 20 percent non-linear low density polyethylene.

6. The stretch wrap thermoplastic multi-layer film of claim 1 wherein the peel off noise level of the film does not exceed 90 Db.

7. The stretch wrap thermoplastic multi-layer film of claim 1 wherein the film has a maximum elongation greater than 300% measured in accordance with ASTM D 4649.

8. The stretch wrap thermoplastic multi-layer film of claim 1 wherein the second layer comprises an ultra low density copolymer of ethylene and 1-octene.

9. The stretch wrap thermoplastic multi-layer film of claim 1, having as a first layer linear low density polyethylene having a melt flow ratio of between about 0.5 and about 10 and a density of between about 0.912 and about 0.935 g. $cm^{-3}$ and a minor amount of non-linear low density polyethylene having a melt flow ratio of between about 0.2 and about 50 and a density of between about 0.910 and about 0.960 g. cm$^{-3}$.

10. A stretch wrap thermoplastic multi-layer film comprising:
   as an inner layer linear low density polyethylene and less than 30 percent non-linear low density polyethylene, and;
   two outer layers of an ethylene polymer each polymer, independently, selected from the group comprising ultra low density polyethylenes having a melt flow ratio of between about 0.1 and about 30 and a density of between about 0.900 and about 0.912 g. cm$^{-3}$ and linear low density polyethylenes having a melt flow ratio of between about 0.1 and about 30 and a density of between about 0.912 and about 0.935 g. cm$^{-3}$, and blends thereof.

11. The stretch wrap thermoplastic multi-layer film of claim 10, wherein the ethylene polymer of the outer layers is independently selected from the group comprising linear low density copolymers of ethylene and 1-butene, 1-hexene and 1-octene and ultra low density copolymers of ethylene and 1-butene, 1-hexene and 1-octene.

12. The stretch wrap thermoplastic multi-layer film of claim 10, wherein the relative thickness of each outer layer, individually, is between 4 and 30 percent of the overall thickness of the film.

13. The stretch wrap thermoplastic multi-layer film of claim 10 wherein the blend of the inner layer contains less than 20 percent non-linear low density polyethylene.

14. The stretch wrap thermoplastic multi-layer film of claim 13 wherein the blend of the inner layer contains between 5 and 20 percent non-linear low density polyethylene.

15. The stretch wrap thermoplastic multi-layer film of claim 10 wherein the peel off noise level of the film does not exceed 90 Db.

16. The stretch wrap thermoplastic multi-layer film of claim 10 wherein the film has a maximum elongation greater than 300 percent and a measured width reduction of 30 percent or less at 200 percent elongation relative to the width of the unstretched film.

17. The stretch wrap thermoplastic multi-layer film of claim 10 wherein at least one of the outer layers comprises an ultra low density copolymer of ethylene and 1-octene.

18. A stretch wrap thermoplastic three layer film having a maximum elongation of 300% or greater measured in accordance with ASTM D 4649, the film consisting essentially of:
   an inner layer of linear low density polyethylene and non-linear low density polyethylene, wherein the blend contains 30 percent or less non-linear low density polyethylene, and;
   two outer layers of an ultra low density polyethylene copolymer independently selected from the group comprising ultra low density ethylene copolymers having an MFR of between about 0.1 and about 30 and a density of between about 0.900 and about 0.912 g. cm$^{-3}$;
wherein the relative thickness of each outer layer, individually, is between about 4 percent and about 10 percent of the overall thickness of the film, and wherein the maximum width reduction is 30 percent relative to the width of the unstretched film.

19. The stretch wrap thermoplastic three layer film of claim 18 wherein the ultra low density copolymer of at least one of the outer layers is an ethylene-1-octene copolymer.

20. The stretch wrap thermoplastic three layer film of claim 9 wherein the ultra low density copolymer of each of the outer layers in an ethylene-1-octene copolymer.

* * * * *

UNITED STATES PATENT AND TRADEMARK OFFICE
CERTIFICATE OF CORRECTION

PATENT NO. : 5,147,709

DATED : September 15, 1992

INVENTOR(S) : Gregory L. Dohrer, Michael D. Holler, Dwyane B. Nichols

It is certified that error appears in the above-identified patent and that said Letters Patent is hereby corrected as shown below:

At column 1, line 68, change "5-3" to --5-13--.

At column 12, line 24, change "0.I" to --0.1--.

At column 12, line 37, change "9" to --19--.

Signed and Sealed this

Seventh Day of September, 1993

Attest:

*Attesting Officer*

BRUCE LEHMAN

*Commissioner of Patents and Trademarks*